Figure 3:
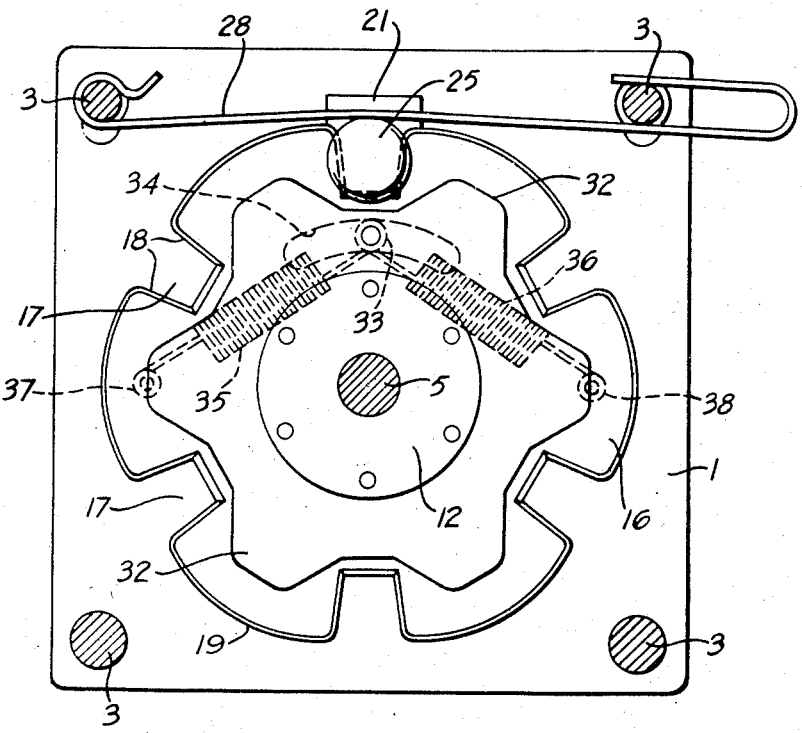

April 8, 1958
A. I. F. SIMPSON
2,829,524
DEVICES FOR TRANSMITTING ROTARY MOTION
Filed April 12, 1954
2 Sheets-Sheet 1
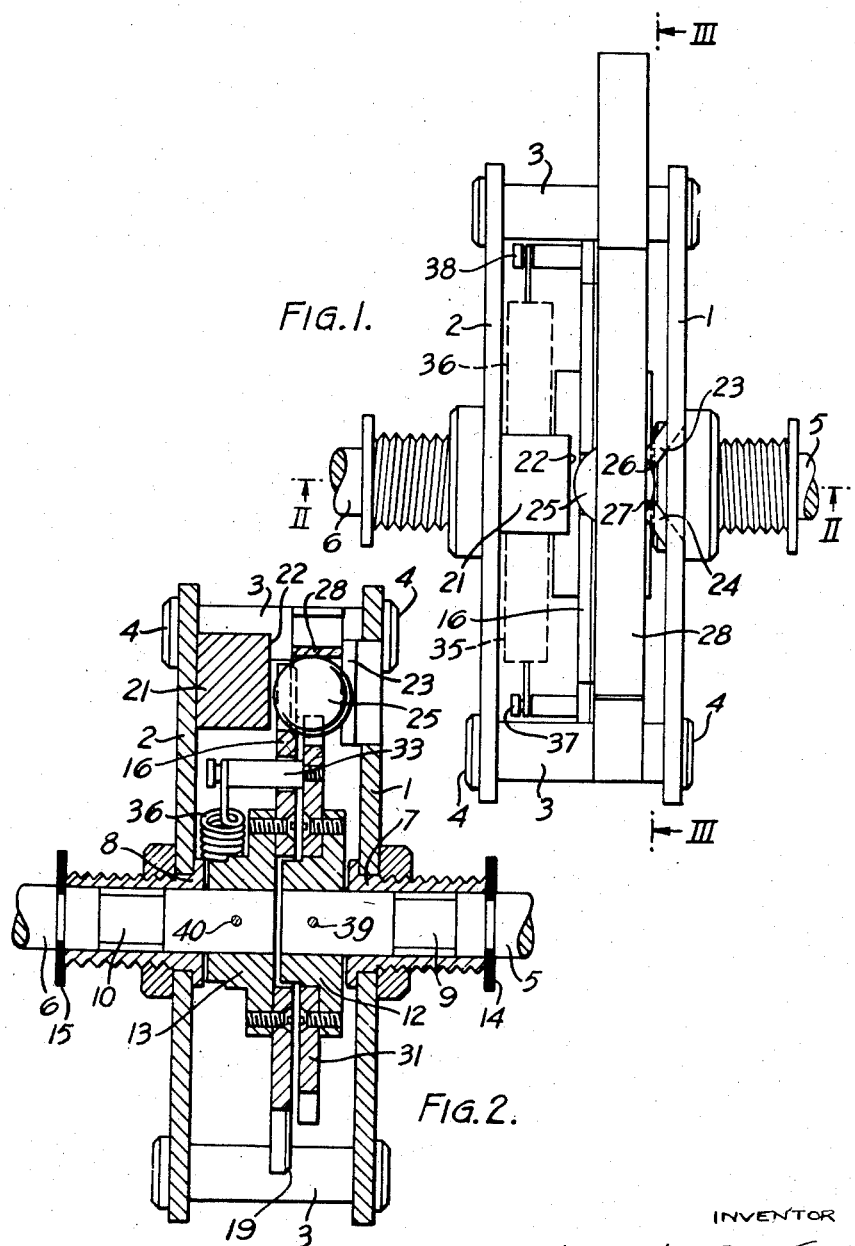
INVENTOR
ARTHUR IAN FORBES SIMPSON
BY
ATTORNEY ered Apr. 8, 1958

United States Patent Office 2,829,524

2,829,524

DEVICES FOR TRANSMITTING ROTARY MOTION

Arthur Ian Forbes Simpson, Leamington Spa, England, assignor to The General Electric Company Limited, London, England Application April 12, 1954, Serial No. 422,639

Claims priority, application Great Britain April 14, 1953

14 Claims. (Cl. 74—10.41)

The present invention relates to devices for transmitting rotary motion.

One object of the present invention is to provide a simple device which comprises a driving shaft and a driven shaft that is adapted to be turned upon rotation of the driving shaft, and which has novel means positively to locate the driven shaft.

According to the present invention, a device for transmitting rotary motion comprises a driving shaft, a driven shaft which is co-axial with the driving shaft and which is required to be positively located in one or more positions, a first part which is coupled to the driven shaft so as to prevent rotation of that part relative to the driven shaft and which is shaped to have one or more indentations corresponding one to each of said positions, a second part, means adapted to couple this second part to the driving shaft so as to prevent rotation of that part relative to the driving shaft, a ball which is spring-biased so that when the driven shaft is located in any one of said positions the ball is urged along a guide which is defined by a pair of opposite sides of the appropriate indentation of the first part and by a pair of fixed parts while the guide is tapered so that the ball then takes up a position in which it makes four point contacts one with each of the sides of the said pair thereof and with each of the said fixed parts thereby locating the driven shaft, and a coupling between the first and second parts which allows a certain amount of relative rotation of the two parts when the driven shaft is positively located although further relative rotation causes the said second part to move the said ball against the spring-bias so as to release the said first part and thereby permit the driven shaft to rotate.

The two shafts may be co-linear. Preferably the first and second parts are rigidly secured to the driving and driven shafts respectively. The first and second parts may be shaped so that relative rotation thereof beyond the allowable amount causes the two parts positively to engage one another so that the two parts then move together.

If, when the driven shaft is positively located, the ball makes point contact with a pair of rectilinear edges provided by the sides of an indentation of the first part and a pair of rectilinear edges provided by each of the pair of fixed parts, these two pairs of edges define the guide and either or both pairs may be inclined to one another in order to give the necessary taper to the guide. Alternatively the sides of an indentation and/or the fixed parts may each provide a surface with which the ball makes contact.

The first and second parts may each comprise a plate and one of them, for example the plate coupled to the driven shaft, may carry a stud which projects into a slot in the other plate, this stud bearing against this other plate when the relative rotation of the two plates exceeds the allowable amount. The contour of the plate coupled to the driven shaft will then have the said indentations while the contour of the other plate may be shaped to bear against the said ball and move it when the relative rotation of the two shafts exceeds the allowable amount.

The two fixed parts may be provided by portions of a unitary body. For example these two parts may be formed by two portions bent out from a plate.

There may be means to apply spring-bias between the first and second parts so that, when the driven shaft is positively located, they tend to take up a predetermined relative position. Relative rotation of the two shafts before the ball is moved to release the driven shaft thus causes this means to store energy which is subsequently utilised to assist in turning the driven shaft when it is released.

One construction of a device in accordance with the present invention will now be described by way of example with reference to the three figures of the accompanying drawings in which Figure 1 shows a plan view of the device, Figure 2 shows a cross-section at the line II—II in Figure 1 and Figure 3 shows a cross-section at the line III—III in Figure 1.

The device to be described is for use in a radio receiver and forms part of the mechanism for switching from one band of frequencies to another. Referring now to the drawings, the device comprises a pair of metal plates 1 and 2 which lie parallel to one another and are spaced apart by four rods 3 to which the plates 1 and 2 are secured by screws 4. A pair of shafts 5 and 6 which have their axes co-linear pass one through each of the plates 1 and 2 so that the axes of the shafts 5 and 6 lie perpendicular to the plates 1 and 2. The shaft 5, which will hereinafter be referred to as the driving shaft, may also pass through the front panel (not shown) of the radio receiver and is connected to a knob (also not shown) which may be turned by an operator tuning the receiver. The shaft 6, which will hereinafter be referred to as the driven shaft, is connected, possibly through a universal coupling (not shown), to a rotary switch (also not shown) which is arranged to effect the required switching from one frequency band to another. For this purpose it is required that the driven shaft 6 shall be capable of being accurately located in any one of six predetermined positions, these positions being spaced 60° apart.

Bearing bushes 7 and 8 are provided where the shafts 5 and 6 pass through the plates 1 and 2 respectively and each shaft where it passes through its associated bush 7 or 8 has an undercut portion 9 or 10 which is packed with grease so that there is effectively provided a double bearing for this shaft. This reduces any possibility of transverse play of the shafts 5 and 6 while longitudinal movement thereof is restricted in one direction by means of hub parts 12 and 13 which are rigidly mounted on the shafts 5 and 6 respectively so as to be close to the bushes 7 and 8 and in the other direction by C-clips 14 and 15 which are sprung on to the shaft. The hub parts 12 and 13 are secured to the shafts 5 and 6 by means of pins 39 and 40, respectively.

A mainly circular plate 16 is secured to the hub part 13 so as to lie perpendicular to the said axis of the two shafts 5 and 6. This plate 16 has six indentations 17 which are equally spaced round its perimeter. Each of these indentations 17 has sides 18 which lie radially of the plate 16 and thus of the said axis and the two sides 18 of each indentation 17 thereby have a taper of approximately 15°. A 45° chamfer is provided at the edge 19 of the plate 16.

A block 21 of metal is secured to the plate 2 and the face 22 of this block 21 lies close to the plate 16. Opposite this block 21 two portions 23 and 24 of the plate 1 are pressed out towards the block 21 so as to provide a pair of planar end surfaces 26 and 27, the adjacent edges of these surfaces being parallel to one another.

For simplicity the portions 23 and 24 are not shown in Figure 3 of the drawings. A metal ball 25 is held captive between the block 21 and the end surfaces 26 and 27 of the portions 23 and 24. A leaf spring 28 urges this ball 25 towards the driving shaft 5 so that the ball 25 makes contact with the circular plate 16 when it is positioned.

In fact when the driven shaft 6 is located in one of its predetermined positions, the ball 25 is forced by the spring bias into the guide which is defined by the two end surfaces 26 and 27 and the surface edges formed by the chamfered portion 19 of the sides 18 of one of the indentations 17. Since the sides of the indentations 17 are inclined to one another, this guide is tapered so that the movement of the ball 25 into the guide is limited, and it will be realised therefore that when the driven shaft 6 is correctly located the ball 25 makes contact with each of the said four edges. The driven shaft 6 is thus accurately located and it cannot be moved from that position merely by applying a torque to that shaft.

In an alternative arrangement, instead of the end surfaces 26 and 27 being provided for the ball 25 to bear against, there may be a channel-shaped member that is secured to the plate 1 so that the channel faces the block 21 and the line of the channel points towards the driving shaft 5, the ball 25 making contact with the pair of rectilinear edges provided by the channel.

The two sides 18 of each indentation 17 may be inclined to one another at a somewhat greater angle. It is, however, essential that, when the driven shaft 6 is located in one of its predetermined positions, the ball 25 shall not be moved merely by applying a torque to the driven shaft 6 so that the angle between the two sides 18 of each indentation 17 should be substantially less than 90°.

In order to enable the driven shaft to be turned when it is positively located in the manner described above, it is necessary to move the ball 25 away from the driving shaft 5 against the bias of the spring 28. For this purpose, the hub part 12 that is carried by the driving shaft 5 has a plate 31 secured to it. This plate 31 is shaped so as to have six teeth 32, and when the driven shaft 6 is located in one of its predetermined positions, the arrangement is such that this plate 31 lies out of contact with the ball 25, the ball 25 being disposed between two adjacent teeth 32.

The plate 31 carries a stud 33 which projects into an arcuate slot 34 in the plate 16, this slot 34 subtending an angle of approximately 60°. Two coil springs 35 and 36 are tensioned between this stud 33 and two studs 37 and 38 which project from the plate 16. In Figures 1 and 3 of the drawings, the springs 35 and 36 are shown diagrammatically each with a broken outline.

The arrangement described above may be modified by interchanging the stud 33 and the slot 34 so that the plate 16 carries the stud 33 while the plate 31 has the slot 34.

It will be appreciated that when the driven shaft 6 is positively located, the driving shaft 5 may be rotated through a small angle without affecting the driven shaft 6. In fact the plates 16 and 31 are spaced apart so as to prevent the possibility of any frictional drive between them. For this purpose the driven shaft 6 may, although this is not shown in the drawings, have an undercut end portion which fits into the driving shaft 5.

Further rotation of the driving shaft 5 in either direction causes a tooth 32 of the plate 31 to bear against the ball 25 and to move it away from the driving shaft 5. This serves to release the plate 16 by the time the stud 33 bears against the end of the arcuate slot 34 in the plate 16 so that the two plates 16 and 31 then turn together. One of the springs 35 and 36 is further tensioned by the relative movement of the two plates 16 and 31 so that when the plate 16 is released the energy stored by this spring is utilised to assist in turning the plate 31 and the driven shaft 6 and thereby giving the device a snap action to the next predetermined position of the driven shaft 6.

The plate 16 is shaped so that the segments between adjacent indentations 17 are somewhat more convex than if the plate 16 were circular so that as that plate 16 is turned the ball 25 moves over a position of top-dead-centre so as to give the device a more positive snap action. The corners at the top of each indentation 17 are rounded off so that the ball 25 moves more smoothly into its locating position. It is essential that the shapes of the two plates 16 and 31 are such that when the plate 16 is positively located the ball 25 does not touch either the bottom of the indentation 17 in that plate or the other plate 31. It is desirable that the two plates 16 and 31 shall be of case-hardened steel.

The driven shaft 6 of the device described above has six positions which are equally spaced. It will be appreciated that the invention is not restricted to this number which may be either increased or decreased and that the positions need not be regularly spaced. If the device is connected to a rotary switch or turret through reduction gearing, it may only be necessary for the driven shaft to be accurately located once every revolution, and in that case the plate carried by that shaft will only have one indentation.

I claim:

1. A device for transmitting rotary motion, said device comprising a driving shaft, a driven shaft which is coaxial with the driving shaft and which is required to be positively located in one or more positions, a first part which is coupled to the driven shaft to prevent rotation of that part relative to the driven shaft and which is shaped to have one or more indentations corresponding one to each of said positions, a second part, means to couple said second part to the driving shaft to prevent rotation of that part relative to the driving shaft, a pair of fixed parts, a ball, means to spring-bias said ball so that when the driven shaft is located in any one of said positions the ball is urged towards the axis of rotation of the shafts along a guide which is defined by a pair of opposite sides of the appropriate indentation of the first part and by the pair of fixed parts and which is tapered to cause the ball to take up a position in which it makes four point contacts one with each of the sides of said pair of opposite ends and with each of the said fixed parts, a mechanical coupling between the first and second parts which allows a certain amount of relative rotation of the two parts when the driven shaft is positively located, and means operable upon further relative rotation of the first and second parts beyond said amount to move said ball against the spring-bias so as to release said first part and thereby permit the driven shaft to rotate.

2. A device according to claim 1 wherein the two shafts are co-linear.

3. A device according to claim 1 wherein the first part is rigidly secured to the driven shaft.

4. A device according to claim 1 wherein the second part is rigidly secured to the driving shaft.

5. A device according to claim 1 wherein the first and second parts are shaped so that relative rotation thereof beyond the allowable amount causes the two parts positively to engage one another so that the two parts then move together.

6. A device according to claim 5 wherein the first and second parts each comprise a plate and one of them carries a stud which projects into a slot in the other plate, this stud bearing against this other plate when the relative rotation of the two plates exceeds the allowable amount.

7. A device according to claim 6 wherein the sides of said indentation or of each of said indentations of the said plate coupled to the driven shaft lie radially with respect to the axis of rotation of that plate.

8. A device according to claim 7 wherein the said plate coupled to the driven shaft is such that, when the driven shaft is located in any one of said positions, the said ball makes point contact with chamfered portions of the sides of an indentation.

9. A device according to claim 1 wherein the said two fixed parts provide two rectilinear edges with which the said ball makes contact when the driven shaft is positively located.

10. A device according to claim 1 wherein the said two fixed parts provide two planar surfaces with which the said ball makes contact when the driven shaft is positively located.

11. A device according to claim 1 wherein the said two fixed parts are portions of a unitary body.

12. A device according to claim 11 wherein the two fixed parts are provided by two portions bent out from a plate.

13. A device according to claim 1 wherein there is means to apply spring bias between the first and second parts so that, when the driven shaft is positively located, they tend to take up a predetermined relative position.

14. A device for transmitting rotary motion, said device comprising a driving shaft, a driven shaft which is co-linear with the driving shaft and which is required to be positively located in a plurality of positions, a first plate which is shaped to have a plurality of indentations corresponding one to each of said positions, means rigidly to secure the first plate to the driven shaft, a pair of fixed parts, a ball, means to spring-bias said ball so that when the driven shaft is located in any one of said positions the ball is urged towards the axis of rotation of the shafts along a guide which is defined by the pair of opposite sides of the appropriate indentation of the first plate and by the pair of fixed parts and which is tapered to cause the ball to take up a position in which it makes four point contacts one with each of the sides of said pair of opposite sides and with each of the said fixed parts, a second plate which has its perimeter shaped to engage said ball and urge it away from the axis of rotation of the shafts when the driving shaft is rotated relative to the driven shaft and the driven shaft is positively located while at the same time permitting a certain amount of relative rotation of the two shafts when the driven shaft is positively located without the second plate engaging the ball and which has a slot through the plate, means rigidly to secure the second plate to the driving shaft, and a stud which is carried by the second plate and which projects through the slot in the second plate.

References Cited in the file of this patent

UNITED STATES PATENTS

| | | |
|---|---|---|
| 2,288,722 | Lear | July 7, 1942 |
| 2,397,435 | Richards | Mar. 26, 1946 |

FOREIGN PATENTS

| | | |
|---|---|---|
| 959,325 | France | Sept. 26, 1949 |
| 280,101 | Germany | Nov. 5, 1914 |
| 721,657 | Germany | June 12, 1942 |
| 803,140 | Germany | Mar. 1, 1951 |
| 67,063 | Norway | Nov. 15, 1943 |